(12) United States Patent
Ehlers et al.

(10) Patent No.: US 7,484,763 B2
(45) Date of Patent: Feb. 3, 2009

(54) FIXING DEVICE FOR A SEAT BELT WINDER

(75) Inventors: Jens Ehlers, Horst (DE); Volkmar Heine, Hamburg (DE); Ronald Jabusch, Elmshorn (DE); Doris Kröger, Tornesch (DE)

(73) Assignee: Autoliv Development AB (SE)

( * ) Notice: Subject to any disclaimer, the term of this patent is extended or adjusted under 35 U.S.C. 154(b) by 482 days.

(21) Appl. No.: 10/536,792

(22) PCT Filed: Nov. 24, 2003

(86) PCT No.: PCT/EP03/13181

§ 371 (c)(1), (2), (4) Date: Jun. 16, 2005

(87) PCT Pub. No.: WO2004/048160

PCT Pub. Date: Jun. 10, 2004

(65) Prior Publication Data

US 2006/0108785 A1  May 25, 2006

(30) Foreign Application Priority Data

Nov. 26, 2002  (DE) .............................. 102 54 968

(51) Int. Cl.
*B60R 22/34* (2006.01)
(52) U.S. Cl. .................................... 280/807
(58) Field of Classification Search ................ 280/806, 280/807; 242/379, 379.2; 297/474, 475, 297/476, 477, 478
See application file for complete search history.

(56) References Cited

U.S. PATENT DOCUMENTS

| | | | |
|---|---|---|---|
| 3,171,688 A | * | 3/1965 | Nicholas .................... 297/475 |
| 3,456,896 A | * | 7/1969 | Fisher ...................... 242/379.2 |
| 4,451,087 A | | 5/1984 | Tamamushi |
| 4,611,854 A | | 9/1986 | Pfeiffer |
| 4,652,012 A | | 3/1987 | Biller et al. |

(Continued)

FOREIGN PATENT DOCUMENTS

FR   2 614 852   11/1988

*Primary Examiner*—John Q. Nguyen
*Assistant Examiner*—Robert A. Coker
(74) *Attorney, Agent, or Firm*—Robert W. Becker; Robert W. Becker & Assoc.

(57) ABSTRACT

The inventive device for fixing a seat belt winder is fixed to the part of a motor vehicle. The plate of the housing of the winder is provided with at lest one fixing hole for receiving a screw connection which maintains the vehicle part embodied therein. The housing of said seat belt winder is arranged in such a way that it is rotatable with respect to the fixing hole of the vehicle part, thereby enabling the winder to be automatically oriented in a direction of a force of a belt which moves at an angle with respect to the axis of the shaft. Said fixing device is characterised in that the housing (10) of the winder is rotationally maintained on the holder part (13, 19, 25) which can be firmly connected to the vehicle part (40). Said housing (10) is supported by the holder part (13, 19, 25) at a distance to the fixing hole (41) of the vehicle part (40) and is fixed to said holder part (13, 19, 25) in such a way that the housing (10) of the seat belt winder is rotatable with respect the holder part (13, 19, 25) in an opposite direction to the action of a pre-set resistance.

17 Claims, 4 Drawing Sheets

U.S. PATENT DOCUMENTS

| | | |
|---|---|---|
| 5,211,694 A | 5/1993 | Sakakida et al. |
| 5,580,091 A * | 12/1996 | Doty .......................... 280/805 |
| 5,823,628 A | 10/1998 | Matsuo |
| 5,951,046 A * | 9/1999 | Hosoda et al. ........... 280/801.2 |
| 6,354,529 B1 * | 3/2002 | Asagiri et al. ............... 242/379 |
| 6,581,969 B2 * | 6/2003 | Nishide ................... 280/801.1 |

* cited by examiner

FIXING DEVICE FOR A SEAT BELT WINDER

This specification for the instant application should be granted the priority date of Nov. 26, 2002, the filing date of the corresponding German patent application 102 54 968.0 as well as the priority date of Nov. 24, 2003 the filing date of International Application PCT/EP2003/013181.

BACKGROUND OF THE INVENTION

The invention relates to a fixing device for a seat belt retractor to be attached to a motor vehicle part, whereby the housing plate of the seat belt retractor housing has at least one fixing opening formed on the motor vehicle part for receiving a screw connection and the seat belt retractor is arranged in such a way that it is rotatable relative to the fixing opening of the motor vehicle part, thereby enabling the retractor to be automatically oriented in a direction of a force of a belt which moves at an angle with respect to the axis of the shaft.

A fixing device with the above-noted features is disclosed in FR 28 14 415. Specifically, it relates in detail to the fixing of a seat belt retractor to the rear storage area of a motor vehicle, whereby the belt unwound from the belt retractor extends from the rear shelf to the shoulder of the strapped-in occupants without interposition of a return device. Because of this, a skewed belt progression results, taking into. consideration the storage position of the belt mounted in the seat belt retractor. This problem is encountered by the fixing device described in FR 28 14 415, in that the seat belt retractor housing is not fixed, but is connected with the vehicle to be pivotable about an axis defined by its attachment screw, whereby a two-leg spring via one spring end is suspended on the vehicle part and presses with the other spring end against the seat belt retractor housing, so that the seat belt retracting is pre-stressed in its starting position and pivots, respectively, against the spring action. The known fixing device is expensive with regard to its mounting, since the seat belt retractor housing is fixed to the vehicle part in such a way that a smooth-running rotation about the axis of the fixing screw is possible. In addition, the mounting of the additionally required spring denotes an additional assembly step.

In addition, it turned out that a practical post-guiding of the seat belt retractor that practically occurs with each fastening or storage process is not necessary; it sufficed, in fact, for protection of the seat belt as well as the seat belt retractor itself, if the seat belt retractor is oriented to the adjusted belt tension under a load. In this manner, in particular, damage to the seat belt and the seat belt retractor under the effect of a load can be avoided.

The invention is based on the object of forming a fixing device having the general features in such a way that the seat belt retractor is mounted in a simple manner and, with a load on the seat belt, rotates relative to its attachment on the motor vehicle part and orients itself with the occurring belt tension.

SUMMARY OF THE INVENTION

The invention contemplates that the seat belt retractor housing is held to be rotatable on a holder part to be fixedly connected with the motor vehicle part and the seat belt retractor housing is held by the holder part at a distance to the fixing opening of the vehicle part and is fixed to the holder part in such a manner that the belt retractor housing is rotatable relative to the holder part in an opposite direction to, i.e. by overcoming, the action of a pre-set resistance. Therefore, the invention is based on the basic idea that the seat belt retractor housing is no longer connected directly via the fixing means with the vehicle part, but rather indirectly upon actuation of a holder part that is fixedly connected to the vehicle part, whereby by means of the adjustment of a distance effected with the assistance of the holder part, the seat belt retractor rotates with a corresponding occurring load relative to the holder means and orients itself thereby in the load direction. An essential mounting advantage is connected with the invention, because the holder part can be mounted to the vehicle part without taking into consideration the movement ratio to be adjusted in cases of load relative to the seat belt retractor. Since the holder part can be premounted, if necessary, to the seat belt retractor housing, during the pre-mounting, the movement ratio between the seat belt retractor housing and the holder part can be adjusted exactly.

In a first embodiment of the invention, it is provided that the holding part is formed as a smooth flat part with an opening for guiding through an attachment means serving for fixing the holder part to the vehicle part and with a further opening for rotatable attachment of the seat belt retractor housing to the holder part. With this embodiment, the distance which makes possible the rotational movement of the seat belt retractor housing relative to the vehicle part is formed in such a manner that with reference to the attachment plane of the vehicle part, the attachment of the seat belt retractor housing to the holder part, on the one hand, and the attachment of the holder part to the vehicle part, on the other hand, are arranged with lateral distance to one another. In this manner, it can be provided that the fixing of the seat belt retractor housing to the holding part takes place by means of a rivet penetrating through the opening of the holder part and the fixing opening of the housing plate of the seat belt retractor housing. The rivet fixing provides, on the one hand, a secure hold of the seat belt retractor to the holder part and makes possible, on the other hand, the desired rotational movement under load conditions.

In alternative embodiments, with regard to the association of the holder part and the housing plate of the seat belt retractor housing having the fixing opening, it can be provided that the holder part rests on the planar housing plate of the seat belt retractor housing provided with the fixing opening or that, alternatively, the housing plate of the seat belt retractor housing providing for connection of the holder part has an offset region for receiving the associated end of the holder part, and the offset region forms a common limitation with the outer edges of the holder part for the rotational movement of the seat belt retractor housing relative to the holding means.

It can be provided further that the holder part has a fixing shoulder extending from it at an angle and insertable into a further opening formed in the vehicle part, as known in the state of the art.

According to a second embodiment of the invention, it is provided that the holder part comprises a collar screw that engages through one of the fixing openings of the housing plate of the seat belt retractor housing and is fixed with an end threading in the fixing opening of the vehicle part, whose collar braces against the vehicle part, whereby the seat belt retractor housing sits with its fixing opening on the collar of the collar screw, and by means of the screw head of the collar screw is held. A spring element is arranged on the collar of the collar screw between the vehicle part and the seat belt retractor housing. With this embodiment, the distance making possible the rotational movement of the seat belt retractor housing is adjusted by the collar of the collar screw used as the fixing means, whereby this collar screw simultaneously serves as the holder part as well as the fixing means. The collar screw can be tightened upon mounting of the seat belt retractor housing with the required torque, without impairing the subsequent possibility for rotational movement of the seat belt retractor housing relative to the collar screw. The resistance required to fix the seat belt retractor housing is effected by the arrangement of the pre-stressed spring element, which can comprise a plate spring, according to one embodiment of the invention.

In a third embodiment, it is provided that a holder part is formed to be U-shaped and attachable to the housing plate having the fixing opening, with the housing plate accommodated between its U-plates, whereby the openings located in the U-plates of the holder part are flush with the fixing opening and one of the U-plates of the holder part, upon mounting of the seat belt retractor to the vehicle part, comes to rest between the vehicle part and the housing plate of the seat belt retractor housing. With this embodiment, the distance ensuring the rotational movement of the seat belt retractor housing is provided such that one of the two U-plates of the holder part, upon mounting of the seat belt retractor with the pre-mounted holder part, rests between the vehicle part and the housing plate and thereby fixes the distance.

For forming the attachment, according to another exemplary embodiment of the invention, it is provided that a fixing nut, which can be screwed into the fixing opening of the vehicle part with the fixing screw, is formed as a collar nut, whose collar height corresponds to the material thickness of the U-plate of the holder part lying between the vehicle part and the housing plate, whereby for fixing the rotational resistance, it can be provided additionally that in the intermediate space formed by the U-plate of the holder part lying between the vehicle part and the housing plate of the seat belt retractor housing, a spring element is arranged; this spring element is formed again as a plate spring according to one embodiment of the invention.

For improving the mounting possibility, according to one embodiment of the invention, it is provided that on the U-plate of the holder part facing away from the vehicle part, projections are formed, which at least partially surround the opening formed therein and which serve as a mounting holder and anti-twist device for a fixing nut; alternatively, it can be provided that on the U-plate of the holder part facing away from the vehicle part, a fixing nut is fixedly mounted oriented with the opening formed thereon.

In a known manner, the holder part can have a fixing shoulder projecting from it at an angle for engaging in an associated further opening in the vehicle part, whereby with such a formation of the holder, it can be provided additionally that the holder part via its fixing shoulder, extends through the housing plate of the seat belt retractor in an associated further opening, so that the seat belt retractor is attached additionally.

According to exemplary embodiments of the invention, it can be provided that the holder part comprises metal and a fixing nut arranged on the holder part is formed as a weld nut fixedly connected with the holder part or that the holder part comprises plastic and a fixing nut provided on the holder part is connected as one piece with the holder part.

In a further embodiment of the invention, it is provided that the holder part comprises a collar nut penetrating through the fixing opening of the housing plate of the seat belt retractor with a collar and which can be screwed onto a fixing screw anchored on the vehicle part, whose collar braces against the vehicle part or the fixing screw, whereby the seat belt retractor housing via its fixing opening, sits rotatably on the collar of the collar nut, and whereby on the side of the housing plate facing away from the vehicle part, a holding sheet held on the collar of the collar nut is arranged, which engages through a further recess arranged in the housing plate via a fixing shoulder projecting from it at an angle and which can be non-rotatably fixed in a further opening formed in the vehicle part, and that the seat belt retractor housing, by means of a tongue projecting into the recess and guided through an aperture formed in the fixing shoulder, is fixed relative to the holding sheet and under a load, as a result of deformation of the tongue engaging through the fixing shoulder, is rotatable. With this embodiment, the distance of the seat belt retractor housing is effected by the collar of the collar nut used as the fixing means, which either braces on the part fixed to the vehicle or is screwed with the fixing screw to the block, so that the seat belt retractor housing is rotatable on the collar of the collar nut. It is to be understood that also a collar screw can be mounted to the seat belt retractor housing, which can be screwed into a corresponding weld nut of the vehicle part formed as a collar nut. For fixing the rotatably disposed seat belt housing and for adjustment of the desired resistance against rotation, the holding sheet is provided, which engages through the seat belt retractor housing via a T-shaped fixing shoulder and thereby is fixed against the vehicle part. In addition, the seat belt retractor housing is penetrated with a tongue projecting into the recess serving for engagement of the fixing shoulder and guided into an aperture formed in the fixing shoulder, so that, in this manner, the seat belt retractor housing is fixed against the holding sheet. With an occurring load, the tongue deforms relative to the fixing shoulder of the holding sheet, so that a rotation of the seat belt roller housing is possible; this rotational movement also is readable on the deformed tongue in the sense of visualizing the rotational movement.

BRIEF DESCRIPTION OF THE DRAWINGS

In the drawings, exemplary embodiments of the invention are provided, which are to be described next. In the drawings.

DESCRIPTION OF SPECIFIC EMBODIMENTS

Figure 1:
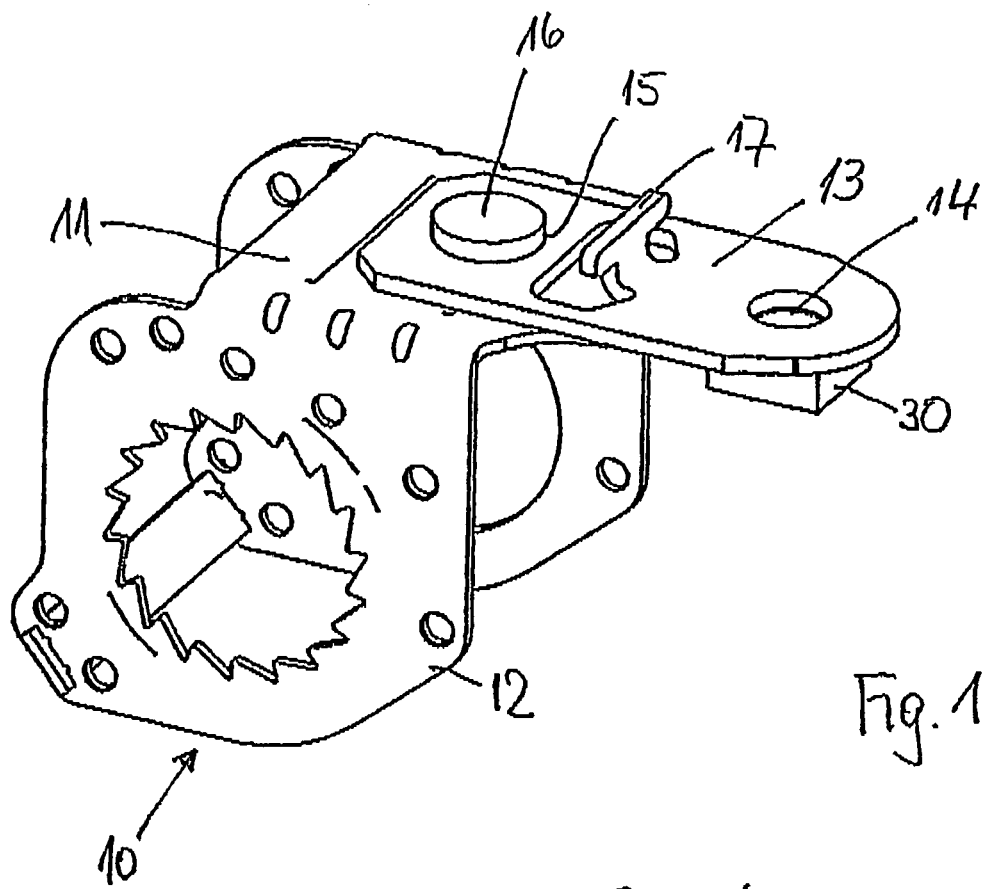
FIG. 1 shows a seat belt retractor with a connected, pre-mounted holder part in a general view.
Figure 2:
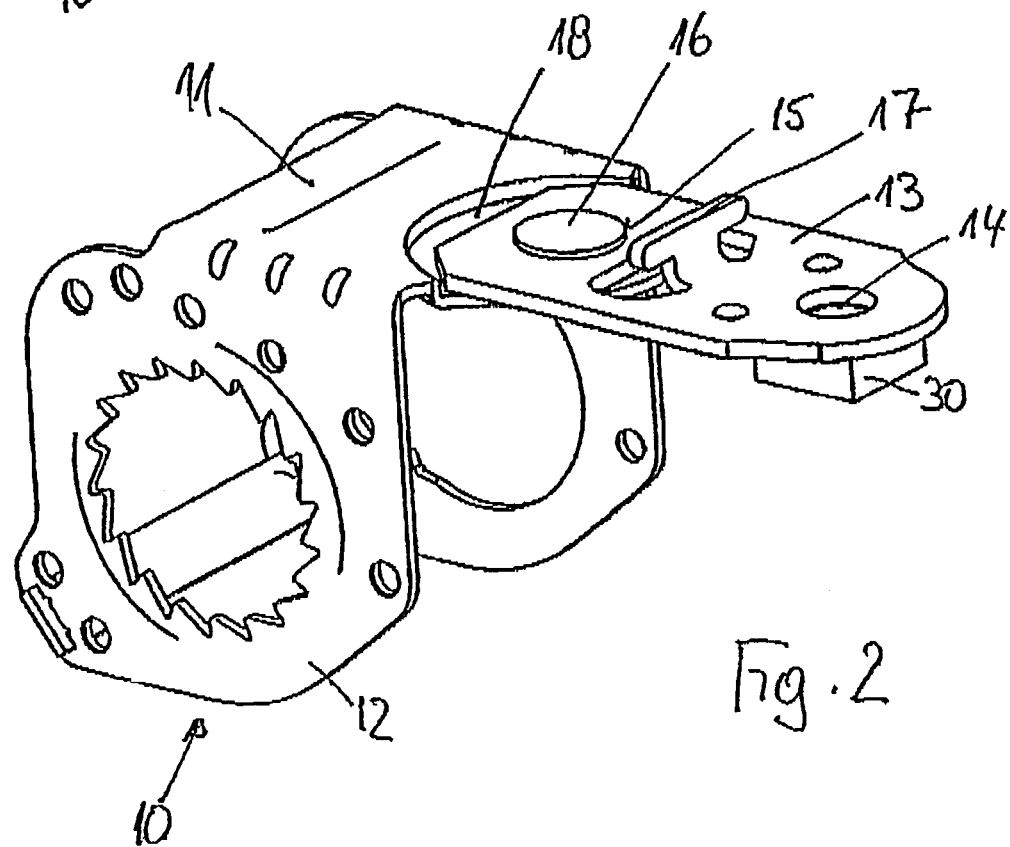
FIG. 2 shows the subject matter of FIG. 1 in a different embodiment.

In FIGS. 1 and 2, for a first embodiment of the invention, a U-shaped seat belt roller or retractor housing is shown with a flat housing plate for attachment of the seat belt retractor housing to a vehicle part and with U-shaped lateral legs 12. The features of the seat belt retractor housing generally are not affected by the invention and in this respect, are known from the state of the art.

For attachment of the seat belt retractor housing 10, a holder part 13 is provided, which is formed as a flat part and has an opening 14 on one end through which a fixing means for attaching the holder part 13 to a non-illustrated vehicle part can be guided. The fixing means can be a fixing screw connected with the vehicle part, which is screwed into a fixing nut 30 mounted to the holder part 13. On the other end of the flat holder part 13, a further opening 15 is formed with which the holder part 13 is attached to the housing plate 11 of the seat belt retractor housing 10, and, namely, by means of a rivet penetrating the further opening 15 and a fixing opening provided in the housing plate 11 of the seat belt retractor housing 10. In addition, the holder part 13 has a fixing shoulder 17 projecting from it at an angle, and formed in to be T-shaped on its end, which is insertable upon attachment of the holder part 13 to a vehicle part in a further opening formed on the vehicle part, whereby this opening is formed such that a positive-fit hooking of the fixing shoulder 17 with the vehicle part is provided; such a feature has long been known in the state of the art.

The exemplary embodiments shown in FIGS. 1 and 2 differ, respectively, in that with the embodiment shown in FIG. 1, the flat holder part 13 rests on the housing plate 11 of the seat belt retractor housing 10, while with the embodiment of FIG. 2, the housing plate 11 has an offset region 18, into which the referenced end of the holder part 13 can be inserted.

With regard to the attachment of the holder part 13 to the housing plate 11 of the seat belt retractor housing 10 via the rivet 16, this rivet first serves for a fixed connection of the seat belt retractor housing 10 with the holder part 13; if a torque acts on the rivet with a tensile loading acting at an angle, then the seat belt retractor housing 10 under the load rotates about the axis of the rivet 16. With the embodiment shown in FIG. 2, then, the end of the holder part 13 lying in the offset region 18 forms a stop for the rotational movement of the seat belt retractor housing 10.

Figure 3:
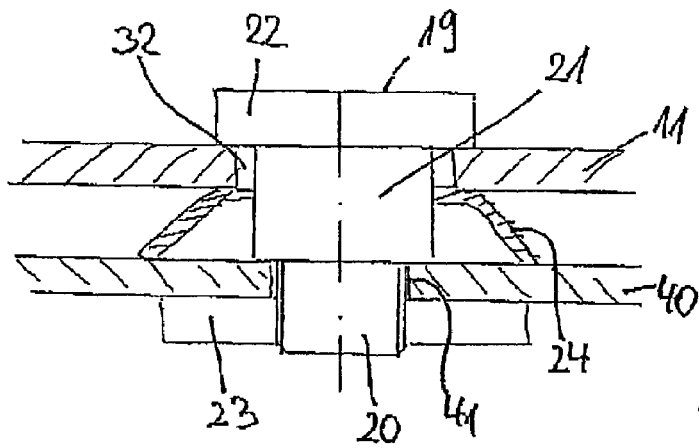
FIG. 3 shows a fixing device with a holder part formed as a collar screw in a schematic, sectional representation.
Figure 4:
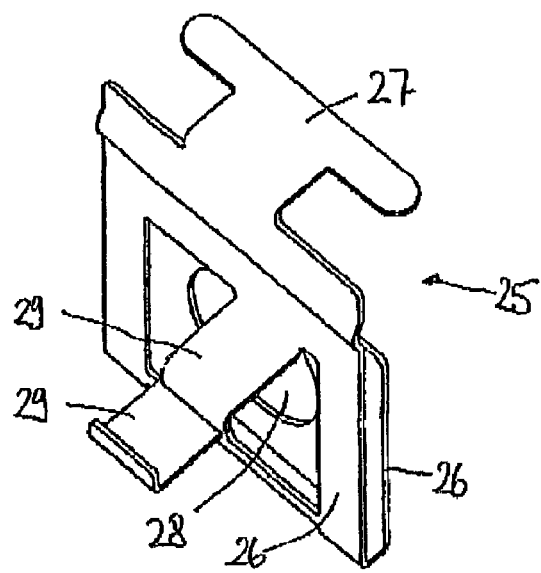
FIG. 4 shows a holder part attachable to the housing plate of a seat belt retractor housing in a perspective view.
Figure 5:
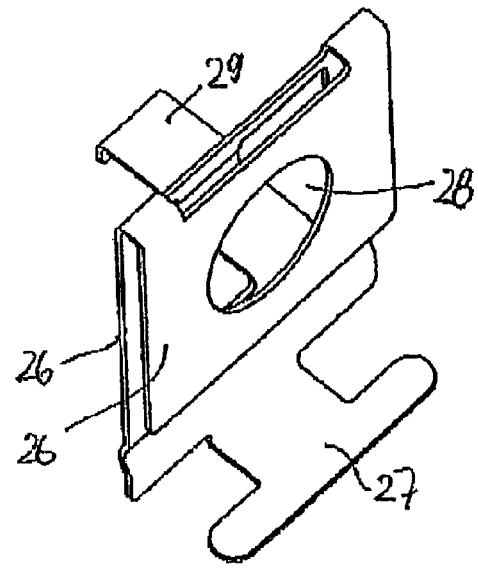
FIG. 5 shows the subject matter of FIG. 4 at another angle.

With the schematically represented embodiment shown in FIG. 3, the holder part is formed as a collar screw 19, so that with this embodiment, the collar screw 19 as well as the holder part serves for the rotational attachment of the seat belt retractor housing as well as an attachment means itself. The collar screw can be inserted through a fixing opening 41 formed in the vehicle part 40 via the threaded region 20 formed on its end and can be screwed in with a weld nut 23 attached on the inside of the vehicle part 40, until the collar 21 of the collar screw 19 abuts the vehicle part 40. On the collar 21 of the collar screw 19, the seat belt retractor housing is rotatably disposed via the fixing opening 32 formed in its housing plate 11, whereby the housing plate 11 is fixed by means of the screw head 22 of the collar screw 19 to this. In this connection, the fixing opening 32 of the housing plate 11 is dimensioned such that the housing plate 11 is rotatable about the collar 21 of the collar screw 19. For the purpose of eliminating rattling, as well as also for adjustment of the required rotational resistance, disposed on the collar 21 of the collar screw 19 is a spring element 24 braced between the vehicle part 40 and the housing plate 11, preferably in the form of a plate spring.

Figure 6:
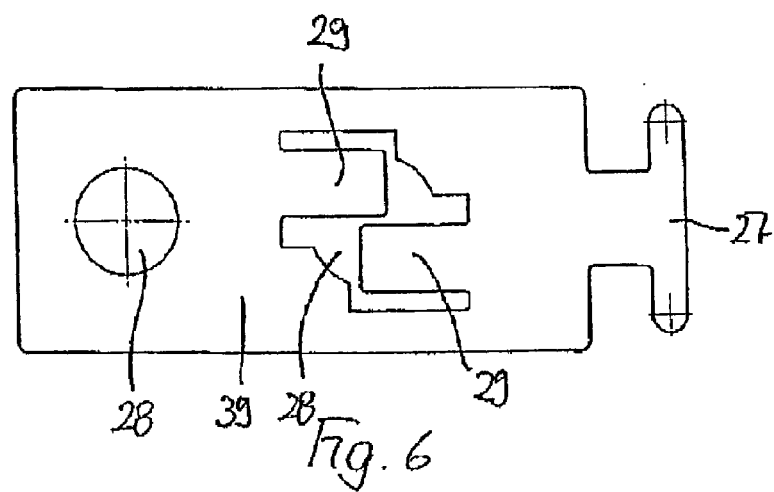
FIG. 6 shows the pre-cut part for the making of the holder part according to FIGS. 4 and 5 in plan view.
Figure 7:
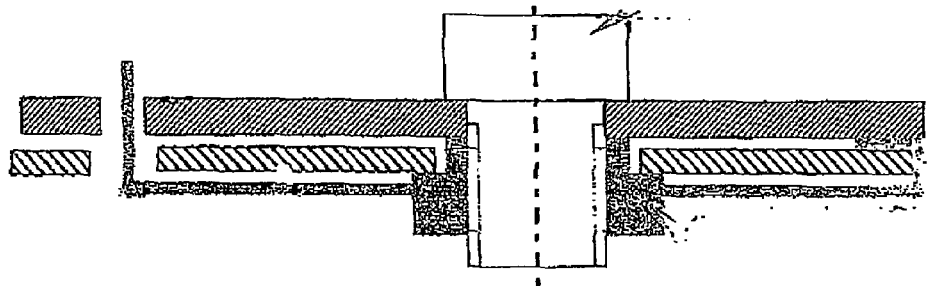
FIG. 7 shows a fixing device with a holder part in a schematic sectional representation.
Figure 8:
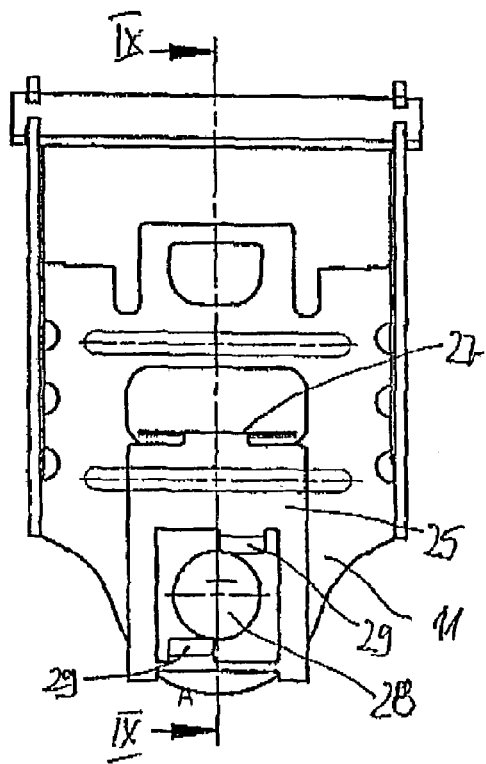
FIG. 8 shows a seat belt retractor housing with a pre-mounted holder part in a front view.
Figure 9:
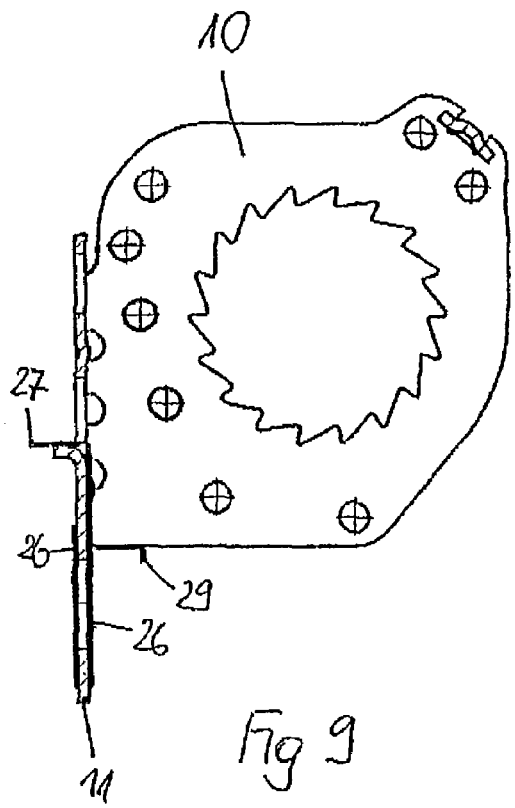
FIG. 9 shows the subject matter of FIG. 8 in a side view according to line IX-IX in FIG. 8.

With the embodiment shown in FIGS. 4 through 9, the holder part 25 is formed by bending out from a flat pre-cut part shown in FIG. 6, whereby the holder part 25 has a U-shaped design with U-plates 26 arranged parallel to one another. On one end of the flat pre-cut part 39, a fixing shoulder 27, already described with reference to the embodiment of FIGS. 1 and 2, is bent out. In addition, by bending out from the flat pre-cut part 39, projections 29 are created, whereby by means of the bending out of the projections 29 in the other U-plate, the associated opening 28 is formed; the projections 29 surrounding the opening 28 exposed by the bending-out serve as a mounting holder and anti-twist device for a fixing nut fixed to the holder part 25, as will be described later. As provided in particular in FIGS. 7 through 9, the U-shaped holder part is placed on the housing plate 11 of a seat belt retractor housing 10 in such a way that the congruent openings 28 of the holder part 25 come to be flush with the fixing opening 32 of the housing plate 11; the fixing shoulder 27 located on the holder part 25 therefore penetrates the housing plate 11 of the seat belt retractor housing 10 in a further recess 33 formed in the housing plate 11. As provided in particular in FIG. 7, a fixing screw 31 is located in the fixing opening 41 of the vehicle part 40, on which the holder part 25 with its openings 28 is inserted, whereby the fixing screw 31 can be screwed with the fixing nut 30 premounted on the holder part 25. Since one of the U-plates 26 lies between the housing plate 11 and the vehicle part 40 upon this mounting, the seat belt retractor housing is freely rotatable relative to the holder part. The rotational resistance, therefore, can be intensified by means of a spring element (not shown further) disposed in the intermediate space between the holder part and the vehicle part.

The specification incorporates by reference the disclosure of German priority document 102 54 968.0 filed Nov. 26, 2002 and PCT/EP2003/013181 filed Nov. 24, 2003.

The present invention is, of course, in no way restricted to the specific disclosure of the specification and drawings, but also encompasses any modifications within the scope of the appended claims.

Figure 10:
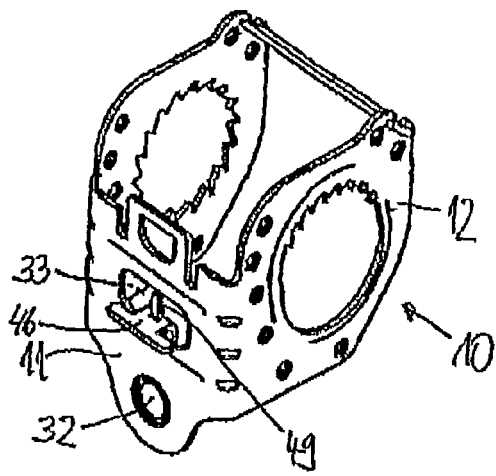
FIG. 10 shows a further embodiment of the fixing device in a perspective general view.
Figure 11:
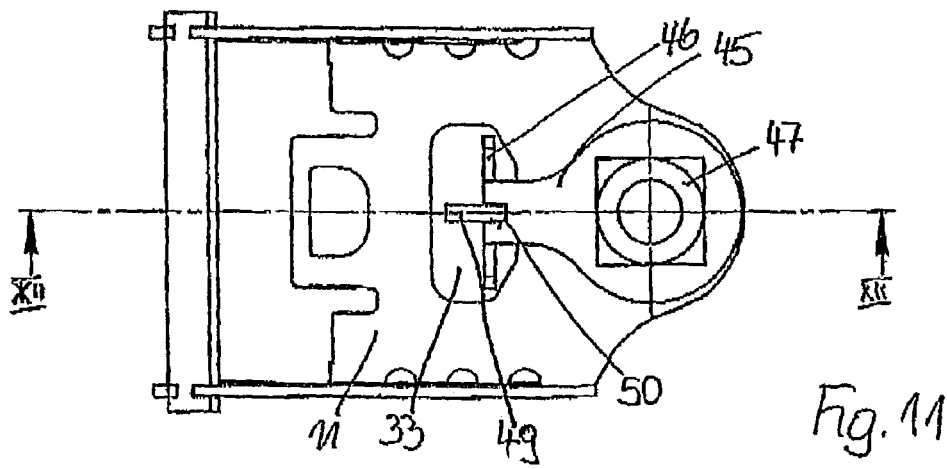
FIG. 11 shows the seat belt retractor housing according to FIG. 10 with a pre-mounted holding sheet in a plan view.
Figure 12:
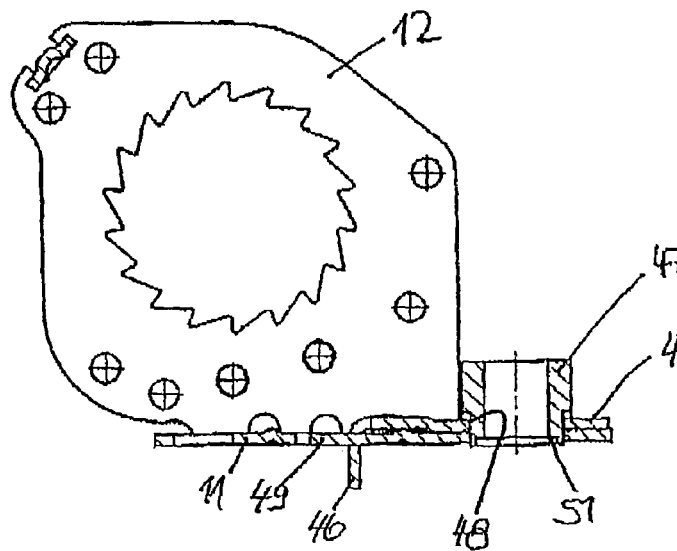
FIG. 12 shows the subject matter of FIG. 11 in a cut-out side view according to line XII-XII in FIG. 11.

With the embodiment shown in FIGS. 10 through 12, a holding sheet 45 is arranged on the top side of the housing plate 11 facing away from the contact side of the seat belt retractor housing 10 on the part fixed to the vehicle (not shown), which penetrates the further recess 33 of the seat belt retractor housing formed in the housing plate 11 via a T-shaped fixing shoulder 46 projecting from this and protrudes until disposed in the plane of the vehicle part serving for attachment; here, the T-shaped fixing shoulder is fixed in an opening of the vehicle part.

For attachment of the seat belt retractor housing 10, a collar nut 47 is attached, which penetrates the fixing opening 32 of the housing plate 11 and simultaneously also penetrates a corresponding, flush opening of the fixing shoulder 46, on whose collar 48 the housing plate 11 of the seat belt retractor housing 10 is arranged in such a manner that the seat belt retractor housing 10 is rotatable about the collar 48. As far as the collar nut 47 also penetrates the holding sheet 45, the holding sheet is non-rotatably fixed for its part via the fixing shoulder 46. The collar nut 47 has a recess 51 for receiving the related end of a fixing screw, with which the collar nut 47 is screwed onto the block, so that no clamping action exists with regard to the housing plate 11 that is to be rotatably held.

In order to fix the seat belt retractor housing 10 first on the collar 48 of the collar nut 47, a tongue 49 that projects into the further recess 33 is provided in the plane of the housing plate 11 on the seat belt retractor housing 10, which penetrates the fixing shoulder 46 reaching through the recess 33 in an aperture 50 and, thereby, extends via a section over the fixing shoulder 46 and projects into the recess 33. In this respect, the seat belt retractor housing 10 first is non-rotatably fixed via the tongue 49 formed fixedly on it to the holding sheet 45. If a rotation of the seat belt retractor housing 10 about the collar 48 of the collar nut 47 occurs with a corresponding load by angular seat belt tension, then this rotational movement is made possible by the deformation of the tongue 49 in the aperture 50 of the fixing shoulder 46, whereby by means of the deformation resistance, simultaneously, the resistance countering the rotational movement is formed. In addition, the degree of the rotational movement of the seat belt retractor housing 10 relative to the holding sheet 45 can be fixed by the position of the deformed tongue 49 relative to the fixing shoulder 46 or in the further recess 33.

The features of the subject matter disclosed in the foregoing description, in the patent claims, in the abstract, and in the drawings can be important individually as well as in any combination for the implementation of the invention in its different embodiments.

The invention claimed is:

1. A fixing device for a seat belt retractor for attachment to a vehicle part, comprising:
    a seat belt retractor housing having a housing plate, wherein the housing plate has at least one fixing opening for receiving a screw connection engaging the vehicle part in a fixing opening formed thereon, wherein the seat belt retractor housing is rotatably disposed relative to the fixing opening of the vehicle part, so that the seat belt retractor is oriented automatically in a direction of a force of a belt which moves at an angle with respect to an axis of a shaft of the seat belt retractor; and
    a holder part, wherein the seat belt retractor housing is rotatably held on the holder part, wherein the holder part is fixedly connected with the vehicle part, wherein the seat belt retractor housing is held by means of the holder part at a distance to the fixing opening, wherein the seat belt retractor housing is fixed to the holder part in such a way that the seat belt retractor housing is rotatable relative to the holder part in a direction opposite to a pre-set resistance, wherein the holder part is formed as a flat part with an opening for guiding through of an attachment means, wherein the attachment means serves to attach the holder part to the vehicle part, wherein the holder part has a further opening for rotatable attachment of the seat belt retractor housing to the holder part, wherein the housing plate of the seat belt retractor housing provided for connection of the holder part has an off-set region for receiving an associated end of the holder part, and wherein the off-set region, together with the outer edges of the holder part, form a limitation for rotational movement of the seat belt retractor housing relative to the holder part.

2. The fixing device according to claim 1, wherein attachment of the seat belt retractor housing to the holder part takes place by means of a rivet penetrating the further opening of the holder part and the fixing opening of the housing plate of the seat belt retractor housing.

3. The fixing device according to claim 1, wherein the holder part rests on the flat housing plate of the seat belt retractor housing provided with the fixing opening.

4. The fixing device according to claim 1, wherein the holder part has a fixing shoulder projecting at an angle from the holder part, wherein the fixing shoulder is insertable into a further opening formed in the vehicle part.

5. The fixing device according to claim 1, wherein the holder part comprises metal, wherein a fixing nut is provided on the holder part, and wherein the fixing nut is formed as a weld nut that is fixedly connected with the holder part.

6. The fixing device according to claim 1, wherein the holder part comprises plastic, wherein a fixing nut is provided on the holder part, and wherein the fixing nut is connected as one piece with the holder part.

7. A fixing device for a seat belt retractor for attachment to a vehicle part, comprising:
    a seat belt retractor housing having a housing plate, wherein the housing plate has at least one fixing opening for receiving a screw connection engaging the vehicle part in a fixing opening formed thereon, wherein the seat belt retractor housing is rotatably disposed relative to the fixing opening of the vehicle part, so that the seat belt retractor is oriented automatically in a direction of a force of a belt which moves at an angle with respect to an axis of a shaft of the seat belt retractor; and
    a holder part, wherein the seat belt retractor housing is rotatably held on the holder part, wherein the holder part is fixedly connected with the vehicle part, wherein the seat belt retractor housing is held by means of the holder part at a distance to the fixing opening, wherein the seat belt retractor housing is fixed to the holder part in such a way that the seat belt retractor housing is rotatable relative to the holder part in a direction opposite to a pre-set resistance, wherein the holder part comprises a collar screw that penetrates through the fixing opening of the housing plate of the seat belt retractor housing, wherein the collar screw is fixed with an end threading in the fixing opening of the vehicle part, wherein the collar screw has a collar and a screw head, wherein the collar braces against the vehicle part, wherein the seat belt retractor housing sits, via the fixing opening, on the collar of the collar screw and is held by means of the screw head, and wherein a pre-stressed spring element is arranged on the collar of the collar screw between the vehicle part and the seat belt retractor housing.

8. The fixing device according to claim 7, wherein the spring element comprises a plate spring.

9. A fixing device for a seat belt retractor for attachment to a vehicle part, comprising:
    a seat belt retractor housing having a housing plate, wherein the housing plate has at least one fixing opening for receiving a screw connection engaging the vehicle part in a fixing opening formed thereon, wherein the seat belt retractor housing is rotatably disposed relative to the fixing opening of the vehicle part, so that the seat belt retractor is oriented automatically in a direction of a force of a belt which moves at an angle with respect to an axis of a shaft of the seat belt retractor; and
    a holder part, wherein the seat belt retractor housing is rotatably held on the holder part, wherein the holder part is fixedly connected with the vehicle part, wherein the seat belt retractor housing is held by means of the holder part at a distance to the fixing opening, wherein the seat belt retractor housing is fixed to the holder part in such a way that the seat belt retractor housing is rotatable relative to the holder part in a direction opposite to a pre-set resistance, wherein the holder part is a U-shaped component having U-shaped plates, wherein said U-shaped plates include a plurality of openings, wherein said U-shaped component is attachable onto the housing plate having the fixing opening, wherein the U-shaped component accommodates the housing plate between the U-shaped plates, whereby the openings in the U-shaped plates of the holder part are flush with the fixing opening of the housing plate, wherein one of the U-shaped plates of the holder part, upon mounting of the seat belt retractor onto the vehicle part, rests between the vehicle part and the housing plate.

10. The fixing device according to claim 9, further comprising a fixing nut that can be screwed via a fixing screw into the fixing opening formed in the vehicle part, wherein the fixing screw is a collar nut having a collar, wherein a height of the collar corresponds to a material thickness of the housing plate of the seat belt retractor housing inclusive of a material thickness of the U-shaped plate of the holder part lying between the vehicle part and the housing plate.

11. The fixing device according to claim 9, wherein an intermediate space is formed by the U-shaped plate of the holder part lying between the vehicle part and housing plate of the seat belt retractor housing, and wherein a spring element is disposed in the intermediate space.

12. The fixing device according to claim 11, wherein the spring element is formed as a plate spring.

13. The fixing device according to claim 9, wherein projections are formed on the U-shaped plate of the holder part facing away from the vehicle part, wherein said projections at least partially surround the opening formed therein, and wherein said projections serve as a mounting holder and anti-twist device for a fixing nut.

14. The fixing device according to claim 9, wherein on the U-shaped plate of the holder part facing away from the vehicle part, a fixing nut is fixedly mounted to be oriented with the opening formed thereon.

15. The fixing device according to claim 9, wherein the holder part has a fixing shoulder projecting from the holder part at an angle for engagement in an associated further opening of the vehicle part.

16. The fixing device according to claim 15, wherein the holder part penetrates the housing plate of the seat belt retractor in an associated further recess via the fixing shoulder.

17. A fixing device for a seat belt retractor for attachment to a vehicle part, comprising:
  a seat belt retractor housing having a housing plate, wherein the housing plate has at least one fixing opening for receiving a screw connection engaging the vehicle part in a fixing opening formed thereon, wherein the seat belt retractor housing is rotatably disposed relative to the fixing opening of the vehicle part, so that the seat belt retractor is oriented automatically in a direction of a force of a belt which moves at an angle with respect to an axis of a shaft of the seat belt retractor;
  a holder part, wherein the seat belt retractor housing is rotatably held on the holder part, wherein the holder part is fixedly connected with the vehicle part, wherein the seat belt retractor housing is held by means of the holder part at a distance to the fixing opening, wherein the seat belt retractor housing is fixed to the holder part in such a way that the seat belt retractor housing is rotatable relative to the holder part in a direction opposite to a pre-set resistance, wherein the holder part comprises a collar nut with a collar, wherein the collar nut penetrates through the fixing opening of the housing plate via the collar and wherein the collar nut can be screwed onto a fixing screw anchored on the vehicle part, wherein the collar abuts the vehicle part or the fixing screw, wherein the seat belt retractor housing sits rotatably with the fixing opening on the collar of the collar nut, and
  a holding sheet, wherein the holding sheet is disposed on a side of the housing plate facing away from the vehicle part and is held on the collar of the collar nut, wherein said holding sheet engages through an associated further recess in the housing plate via a fixing shoulder projecting from the holding sheet at an angle, wherein said fixing shoulder can be fixedly, non-rotatably disposed in a further opening formed in the vehicle part, and further comprising a tongue, wherein the seat belt retractor housing, by means of the tongue projecting into the recess and guided through an aperture formed in the fixing shoulder, is fixed relative to the holding sheet, wherein under a load, the seat belt retractor housing is rotatable as a result of deformation of the tongue engaging through the fixing shoulder.

* * * * *

UNITED STATES PATENT AND TRADEMARK OFFICE
CERTIFICATE OF CORRECTION

PATENT NO.        : 7,484,763 B2                                              Page 1 of 1
APPLICATION NO.   : 10/536792
DATED             : February 3, 2009
INVENTOR(S)       : Ehler et al.

It is certified that error appears in the above-identified patent and that said Letters Patent is hereby corrected as shown below:

Title Page,

Item [54] should read as follows:

-- [54] Title: FIXING DEVICE FOR A SEAT BELT RETRACTOR --

Signed and Sealed this

Thirty-first Day of March, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,484,763 B2 | Page 1 of 1 |
| APPLICATION NO. | : 10/536792 | |
| DATED | : February 3, 2009 | |
| INVENTOR(S) | : Ehler et al. | |

It is certified that error appears in the above-identified patent and that said Letters Patent is hereby corrected as shown below:

Title Page, Item (54) and Column 1, line 1

Should read as follows:

-- FIXING DEVICE FOR A SEAT BELT RETRACTOR --

This certificate supersedes the Certificate of Correction issued March 31, 2009.

Signed and Sealed this

Twenty-first Day of April, 2009

JOHN DOLL
*Acting Director of the United States Patent and Trademark Office*